US006323912B1

(12) United States Patent
McIntyre

(10) Patent No.: US 6,323,912 B1
(45) Date of Patent: Nov. 27, 2001

(54) ELECTRONIC CAMERA WITH MICROFLUIDIC PRINTER THAT PRINTS SCENTED IMAGES

(75) Inventor: Dale F. McIntyre, Honeoye Falls, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 08/975,546

(22) Filed: Nov. 20, 1997

(51) Int. Cl.[7] ........................................................ H04N 7/00
(52) U.S. Cl. ............................................................ 348/552
(58) Field of Search ................................... 348/207, 552, 348/220; 347/1–3; 358/906

(56) References Cited

U.S. PATENT DOCUMENTS

| 4,262,301 | | 4/1981 | Erlichman . | |
|---|---|---|---|---|
| 4,908,252 | | 3/1990 | Carnahan et al. . | |
| 5,093,182 | * | 3/1992 | Ross | 428/195 |
| 5,313,611 | | 5/1994 | Franklin et al. . | |
| 5,335,072 | * | 8/1994 | Tanaka et al. | 348/232 |
| 5,432,906 | | 7/1995 | Newman et al. . | |
| 5,474,805 | * | 12/1995 | Vaughn | 427/207.1 |
| 5,477,249 | * | 12/1995 | Hotomi | 347/48 |
| 5,515,085 | * | 5/1996 | Hotomi et al. | 347/6 |
| 5,577,947 | | 11/1996 | Malloy et al. . | |
| 5,605,750 | | 2/1997 | Romano et al. . | |
| 5,611,847 | | 3/1997 | Guistina et al. . | |
| 5,847,836 | * | 12/1998 | Suzuki | 347/3 |
| 5,975,675 | * | 11/1999 | Kim | 347/20 |
| 5,980,010 | * | 11/1999 | Stephenson | 347/2 |
| 5,995,770 | * | 11/1999 | Rochford et al. | 396/311 |
| 6,004,666 | * | 12/1999 | Hornig et al. | 428/321.5 |

* cited by examiner

Primary Examiner—Chris Kelley
Assistant Examiner—Mitchell White
(74) Attorney, Agent, or Firm—Raymond L. Owens; Stephen H. Shaw

(57) ABSTRACT

In an electronic camera responsive to a digital image stored in such camera and having a microfluidic printer for printing images onto a receiver to form continuous tone color pixels corresponding to the stored digital image, including focusing an image of a subject at an image plane; area image sensor disposed at the image plane for receiving the image subject and producing a digital image representing the subject; and digital storage coupled to the area image sensor for storing the digitized image of the subject. The microfluidic printer including a plurality ol colorant reservoirs including reservoirs for containing cyan, magenta, and yellow colorants, respectively, and a plurality of colorant delivery chambers, including a fourth reservoir containing a colorant modifying fluid wherein the colorant modifying fluid includes a particular scent; selectable mode control circuit responsive to the digital image for causing colorants to be delivered from colorant reservoirs to selected colorant delivery chambers in the correct amount and for delivering the colorant modifying fluid containing the particular scent from the fourth reservoir to selected delivery chambers; and the printer causing the transfer of the colorants with the selected colorant modifying fluid in the delivery chamber to the receiver to form a continuous tone color image having the desired scent.

4 Claims, 3 Drawing Sheets

ELECTRONIC CAMERA WITH MICROFLUIDIC PRINTER THAT PRINTS SCENTED IMAGES

CROSS REFERENCE TO RELATED APPLICATIONS

Reference is made to commonly assigned U.S. patent application Ser. No. 08/951,017 filed Oct. 15, 1997, entitled "Camera With Microfluidic Printer" assigned to the assignee of the present invention. The disclosure of these related applications is incorporated herein by reference.

FIELD OF THE INVENTION

The present invention relates to electronic cameras which include microfluidic printers that produce scented prints.

BACKGROUND OF THE INVENTION

It is known in the prior art to provide an electronic camera which uses an area image sensor. Digital images produced from the image sensor are stored in memory and these images can be shown on a display so that the user can determine which image should be stored for use in producing hard copy images. Typically, these images can be stored in a magnetic disk or a compact PCMCIA Memory Card.

In U.S. Pat. No. 4,262,301 an electronic camera is disclosed which includes a display device. The camera also includes a digital-to-analog converter which sends signals to the display. Also, the digital-to-analog converter selectively sends these images to a magnetic tape for storage. Images on the magnetic tape can then be produced as a hard copy by a printer which is provided on the camera. A problem with the approach in U.S. Pat. No. 4,262,301 is approach is that a print must be made in order for a user to determine whether it is satisfactory.

A shortcoming with prior electronic cameras is that the printer is spaced from the camera and must be electrically coupled to digital storage structure within the camera which frequently produces artifacts. Another shortcoming in the prior art is that a typical print only appeals to one sense, that of sight. Memory is more effectively recalled when a plurality of senses are engaged. Scents can often trigger a favorable response in a user viewing a print and, moreover, can help the user to recall the particular time or location of the print.

SUMMARY OF THE INVENTION

An object of this invention is to provide an electronic camera with an integrated compact, low powered multimode printer which rapidly prints high quality continuous tone images and forming such images with desired scents.

This objects is achieved in an electronic camera responsive to a digital image stored in such camera and having a microfluidic printer for printing images onto a receiver to form continuous tone color pixels corresponding to the stored digital image, the improvement comprising:

a) means for focusing an image of a subject at an image plane;

b) area image sensor means disposed at the image plane for receiving the image subject and producing a digital image representing the subject;

c) storage means coupled to the area image sensor for storing the digitized image of the subject;

d) the microfluidic printer including a plurality of colorant reservoirs including reservoirs for containing cyan, magenta, and yellow colorants, respectively, and a plurality of colorant delivery chambers, the microlluidic printer further including;

i) a fourth reservoir containing a colorant modifying fluid wherein the colorant modifying fluid includes a particular scent;

e) selectable mode control means responsive to the digital image for causing colorants to be delivered from colorant reservoirs to selected colorant delivery chambers in the correct amount and for delivering the colorant modifying fluid containing the particular scent from the fourth reservoir to selected delivery chambers; and f) means for causing the transfer of the colorants with the selected colorant modifying fluid in the delivery chamber to the receiver to form a continuous tone color image having the desired scent.

Advantages

An electronic camera with a microfluidic printer, in accordance with the present invention provides not only visually pleasing continuous tone images, but also causes a desired scent to be incorporated into such images.

DETAILED DESCRIPTION OF THE INVENTION

Before discussing the electronic camera in accordance with the present invention, a inicrofluidic printer which is used in the camera will now be described.

Figure 2:
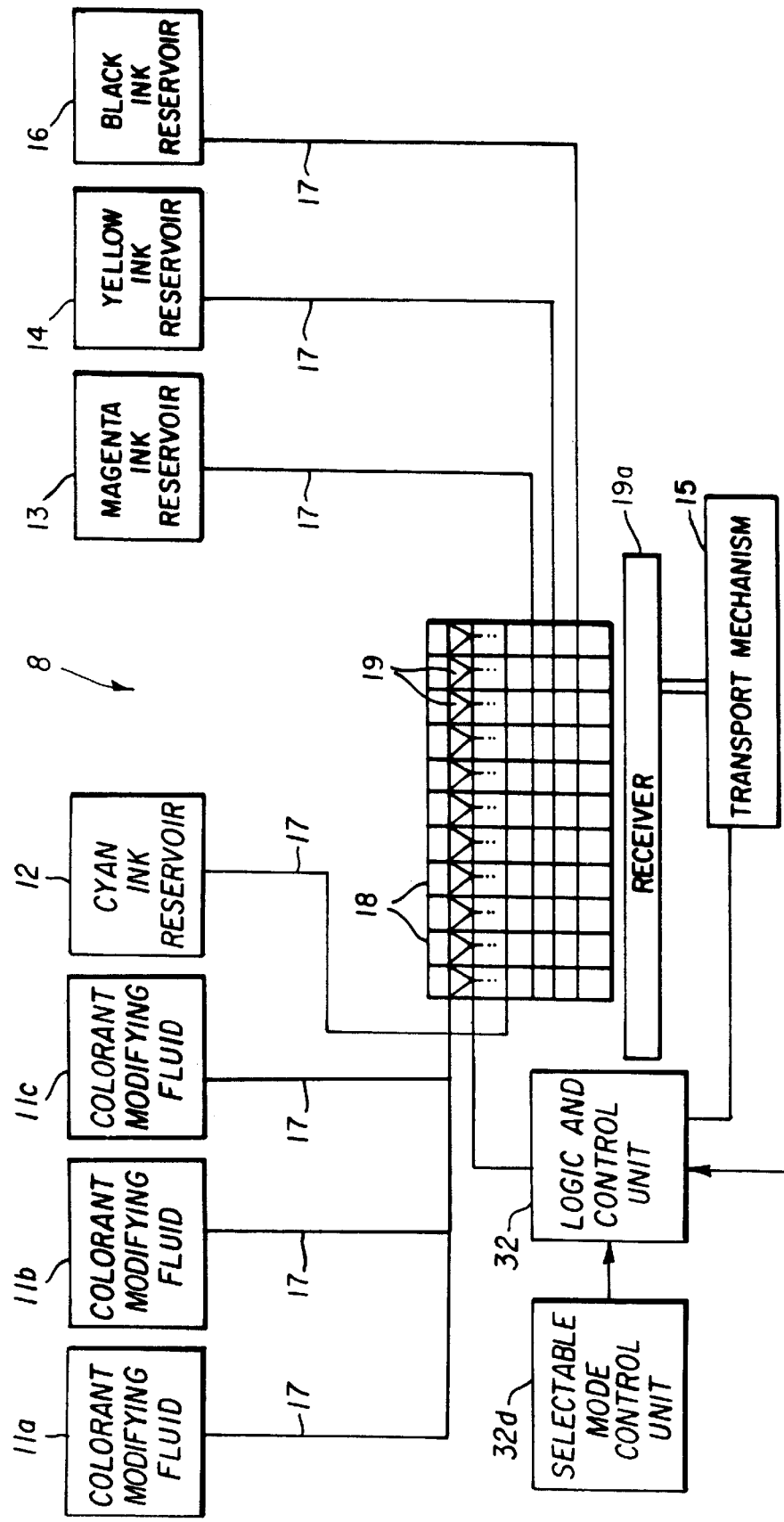
FIG. 2 is a partial schematic view showing the printer for pumping, mixing, and printing scented pixels on a reflective receiver.

Referring to FIG. 2, a schematic diagram is shown of a printer 8 in accordance with the present invention. Reservoirs 11a, 11b, and 11c are respectively provided for holding colorant modifying fluid. Reservoirs 12, 13, and 14 are respectively provided for holding cyan colorant, magenta colorant, and yellow colorant. These reservoirs are actually provided by colorant cartridges which are insertable into the printer 8 of the camera. A reservoir 16 is shown for black colorant. Microchannel capillaries 17 respectively connected to each of the reservoirs conduct colorant from the corresponding reservoir to an array of colorant delivery chambers 18. In the present invention, the colorant delivery chambers 18 deliver the colorant directly to a receiver 19a; however, other types of colorant delivery arrangements can be used such as microfluidic channels, and so when the word chamber is described, it will be understood to include those arrangements. The colored colorants are delivered to colorant delivery chambers 18 by electrokinetic pumps 19. The amount of each color colorant is controlled by logic and control unit 32 according to a stored digital image. For clarity of illustration, only one electrokinetic pump 19 is shown for the colorant modifying fluid channel. Similar pumps are used for the other color channels, but these are omitted from the figure for clarity. Finally, a receiver 19a is transported by a transport mechanism to come in contact with the microfluidic printer 8. The receiver 19a accepts the colorant and thereby produce the print.

Figure 3:
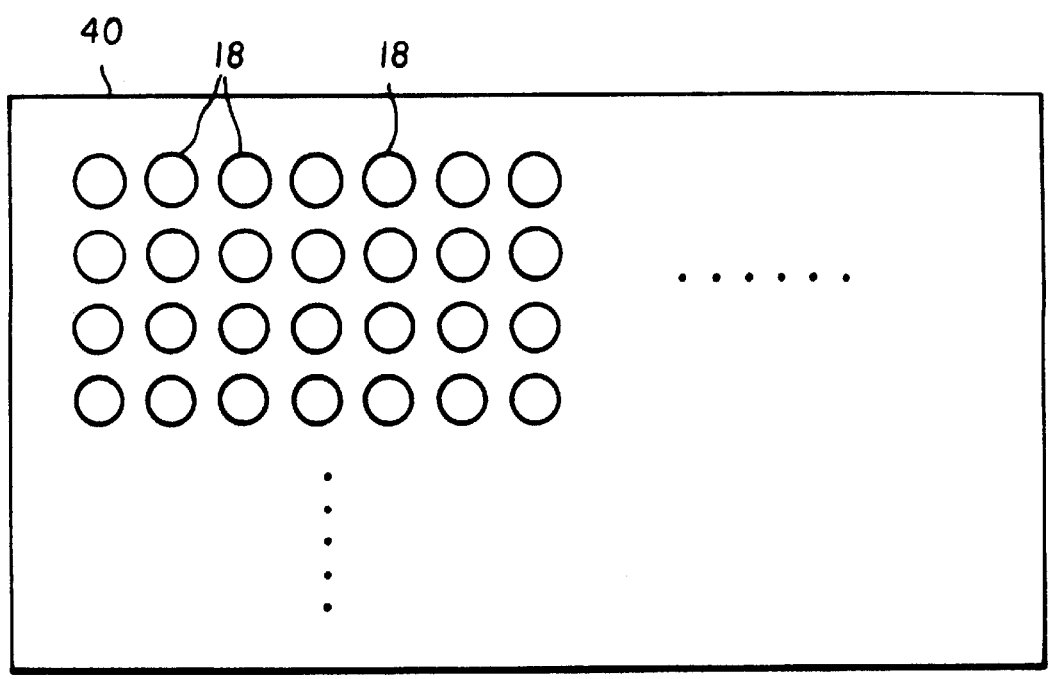
FIG. 3 is a top view of the colorant delivery chambers in the printer of FIG. 2.

FIG. 3 depicts a top view of an arrangement of delivery chambers 18 shown in FIG. 2. Each colorant delivery chamber 18 is capable of producing a mixture of colorants of different colors having any color saturation, hue, and lightness within the color gamut provided by the set of colorants used in the apparatus. This results in a continuous tone photographic quality image on the reflective receiver 19a. As shown in FIG. 2, there is provided a logic and control unit 32 which receives a digital image. As will be discussed, the digital image is included in an image file which also includes data representative of the scent and the amount of such scent to be applied to formed image. The digital image includes a number of digital pixels which represents a continuous tone colored image. The logic and control unit 32 is connected to the electrokinetic pump 19 and controls its operation. In FIG. 2, the logic and control unit 32 includes a series of separate functional elements including central processing unit 32a, execution memory 32b, and program memory 32c. A selectable mode control unit 32d selects the particular mode of operation which will be controlled by the central processing unit 32a. More particularly, it causes the pump to meter the correct amount of colorants into each of the colorant delivery chambers 18 to provide both the correct hue and tone scale for each colored pixel. Another function of the logic and control unit 32 is to arrange the array of image pixels in the proper order so the image will be right reading to the viewer. The logic and control unit 32 includes a matrix, or look-up table, which is determined experimentally, of all the colors which can be achieved by varying the mixture ol colorants. When a data for a particular pixel (8 bits per color plane) is inputted, the output from the look-up table will control signals to the electrokinetic pumps 19 to meter out the correct amount of each colorant. Look-up tables are also included which are responsive to the selected scent and the amount ol such scent. The logic and control unit 32 also controls the amount of scent. Also provided is a transport mechanism 15 which is adapted to move the receiver 19a into and out of engagement with the colorant delivery chambers 18 under the control of the logic and control unit 32. After the colorant delivery chambers 18 have the appropriate amount of mixed colorant, the logic and control unit 32 signals the transport mechanism 15 to move the receiver 19a into engagement with the colorant delivery chambers 18 for colorant transfer.

The colored colorants used in this invention are dispersions of colorants in common solvents. Examples of such colorants are found is U.S. Pat. No. 5,611,847 by Gustina, Santilli, and Bugner. Colorants are also be found in the following commonly assigned U.S. patent application Ser. No. 08/699,955 filed Aug. 20, 1996 entitled "Cyan and Magenta Pigment Set"; U.S. patent application Ser. No. 08/699,962 filed Aug. 20, 1996 entitled "Magenta Colorant Jet Pigment Set"; U.S. patent application Ser. No. 08/699, 963 filed Aug. 20, 1996 entitled "Cyan Colorant Jet Pigment Set", all by McInerney, Oldfield, Bugner, Bernel, and Santilli; and in U.S. patent application Ser. No. 08/790,131 filed Jan. 29, 1997 entitled "Heat Transferring Colorantjet Colorant Images" by Bishop, Simons, and Brick; and U. S. patent application Ser. No. 08/764,379 filed Dec. 13, 1996 entitled "Pigmented Colorantjet Colorants Containing Phosphated Ester Derivatives" by Martin, the disclosures of which are incorporated by reference herein. In a preferred embodiment of the invention the solvent is water. Colorants such as the Ciba Geigy Unisperse Rubine 4BA-PA, Unisperse Yellow RT-PA, and Unisperse Blue GT-PA are also preferred embodiments of the invention. The colorant modifying fluid of this invention call take a number of different forms, which will suggest themselves to those skilled in the art. If the colored colorants are water soluble, then the colorant modifying fluid can indeed be water. Concentrated fragrant oils which can be mixed with ink are known in the art and generally include natural or synthetic oils with different characteristics. They are available in different blends and are sometimes designated as highly concentrated perfumes. For a more complete discussion of such scented oils, see U.S. Pat. No. 5, 577,947, the disclosure of which is incorporated herein by reference. A fragrance of oil or blended fragrance of oils may be mixed with polymers or other additives in a manner such as disclosed in U.S. Pat. No. 4,908,252, the disclosure of which is incorporated herein by reference.

The reflective receiver 19a can be common paper having sufficient fibers to provide a capillary force to draw the colorant from the colorant delivery chambers 18 into the paper. Synthetic papers can also be used. The receiver 19a can have a coated layer of polymer which has a strong affinity, or mordanting effect for the colorants. For example, it a water based colorant is used, the colorant modifying fluid can be water, which also acts as a solvent, and a layer of gelatin will provide an absorbing layer for these mixed colorants. In a preferred embodiment of the invention, an exemplary reflective receiver is disclosed in commonly assigned U.S. Pat. No. 5,605,750 to Romano et al.

Figure 1:
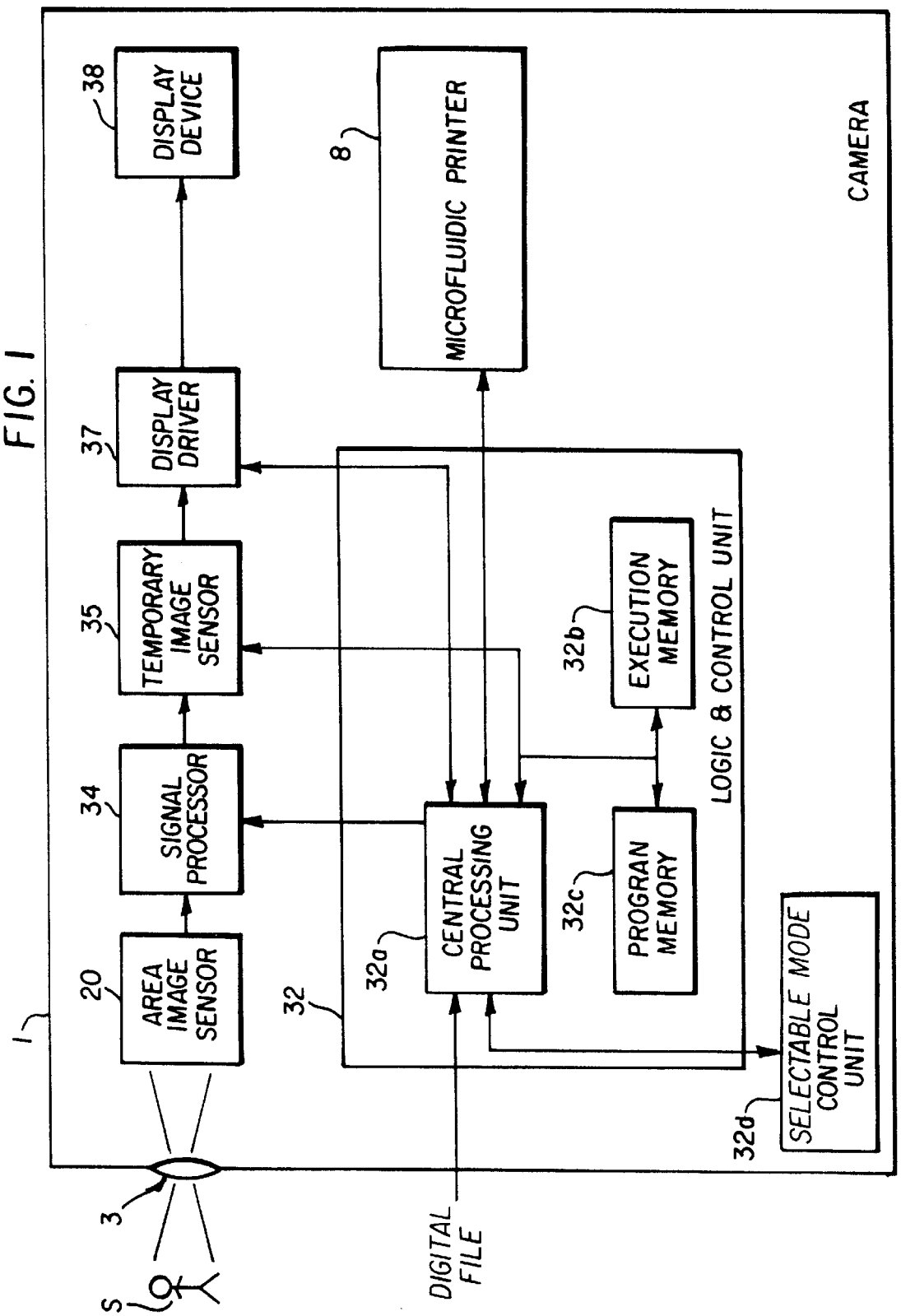
FIG. 1 is a block diagram of a digital camera in accordance with the present invention with the necessary electronics for operating the camera and having a microfluidic printer which also can deliver scent to a receiver.

Now turning to FIG. 1, a block diagram is shown of various systems within the camera 1. As shown, a subject S is positioned in front of the imaging lens 3. The camera 1 includes an area image sensor 20 arranged to coincide with the axis of the imaging lens 3. The printer 8 has been discussed. An image of the subject is focused on the area image sensor 20. Area image sensor 20 can be a full frame charge coupled device (CCD) or, alternatively, can be an interline device with, for example, photodiode pixels which are adapted to deliver charge to interline CCDs. Conventional electronic circuitry (not shown) is associated with the image sensor 20. After the image sensor 20 receives light representative of the image of the subject S, the circuitry sets up, acquires, and transfers electronic signals from the area image sensor 20. Such electronics are well known in the art and their description is omitted for clarity of discussion.

Logic and control unit 32 causes the area image sensor 20 to transfer electrical signals to signal processor 34. The logic and control unit 32 includes a central processing unit 32a, program memory 32c, and execution memory 32b. Selectable mode control unit 32d, which can be under the control of a user, signals the central processing unit 32a as to the correct mode of operation. In one mode, the printer is to apply scents from at least one of the reservoirs 11a, 11b, or 11c into the microchannel capillaries 17 where they are delivered to the colorant delivery chambers 18 with the correct amount of scent. Alternatively, the selectable mode control unit 32d can signal the central processing unit 32a to read a digital file having a digital image to provide signals to control the delivery of scents from the reservoirs 11a, 11b, and 11c in the appropriate amount into the microchannel capillaries 17 where they are to be mixed with the colorants from reservoirs 12, 13, 14, and 16. The signal processor 34 will be understood to include that circuitry necessary for converting the area image sensor signals to electrical signals and includes gain control and analog-to-digital circuitry as well known in the art. The logic and control unit 32 can, ol course, include a microprocessor as is well known to those skilled in the art. The signal processor 34 delivers, under the control of logic and control unit 32, signals into a storage location in a temporary image memory 35 which can be either a floppy disk or semiconductor memory under the control of logic and control unit 32. These signals, when stored, represent a digital image of the subject. The logic and control unit 32 also delivers signals to the microfluidic printer 8 which include the necessary information for controlling the amount of the colorant modifying fluid to the colorant delivery chambers 18. The logic and control unit 32 causes the digital signals in temporary image memory 35 to be applied to a display driver 37 which, in turn, applies signals to a display device 38. The display driver 37 will be understood to include a digital-to-analog converter and formatting control which is appropriate for the type of display device as well known in the art. The display device 38 may be embodied as a liquid crystal display. As well understood to those skilled in the art, the logical and control unit 32 provides refresh signals to the display device 38. It will be understood that the logic and control unit 32 can also deliver the digital image to an external device such as a personal computer.

The logic and control unit 32 which includes the central processing unit 32a that may be provided by a microprocessor chip. Execution memory 32b is also shown and is typically provided by random access memory (RAM). This memory is used for computation during image adjustment of the various parameters. As is well known to those in this art, the program memory 32c (typically ROM) can include conventional image processing algorithms for changing image resolution and the color content by so-called color management programs. The selectable mode control unit 32d can include a keyboard, a manual switch or a combination of both, to permit a user to select the appropriate mode which, in effect, causes the central processing unit 32a to select the appropriate program in program memory 32c.

The program memory 32c can include a program which can be selected by the selectable mode control unit 32d wherein the type and amount of scent from the reservoirs 11a, 11b, and 11c are selected depending upon a predetermined condition such as a date or season of the year. The date can be included in a clock chip (not shown) and a program associated with the central processing unit 32a. As noted above, the program memory 32c can include image processing algorithms. Many of such image processing algorithms have been implemented as commercially available packages such as: Photoshop (trademark of Adobe Systems Incorporated), Color Studio (trademark of Letraset), and PhotoMac (trademark of Avalon Development Group). For examples of color management systems including color transforms for changing color content such as contrast, brightness, and gamut, see U.S. Pat. Nos. 5,313,611 and 5,432,906, the disclosures of which are incorporated herein by reference.

The present invention is described in relation to a continuous tone printer. It will be understood by those skilled in the art that the term "continuous tone images" will include not only continuous tone images recorded from nature, but also computer generated images, graphic images, line art, text images and the like. It will also be understood that the term "colorant modifying fluid" refers to colorant modifying fluid or white fluids that do not absorb visible light when the colorant modifying fluid is transferred to a reflective receiver. The colorant modifying fluid must be selected so that it can readily absorb the scented materials.

The typical printing operation in the present invention involves the following steps. First, the selectable mode control unit 32 receives a digital image or digital image file consisting of electronic signals in which the color code values are characterized by bit depths of an essentially continuous tone image, for example, 8 bits per color per pixel. Based on the color code values at each pixel in the digital image, which define the lightness, hue, and color saturation at the pixel, logic and control unit 32 operates the electrokinetic pumps 19 to mix the appropriate amount of colored colorants and colorant modifying fluids including appropriate scent content in the array of colorant delivery chambers 18. Stated differently, the corresponding mixed colorants in each chamber 18 are in an amount corresponding to a code value for a digital colored pixel. The mixture of colorants, which has the same hue, lightness, and color saturation as the corresponding pixel of the original image being printed, is held in the colorant delivery chamber by the surface tension of the colorant. The reflective receiver 19a is subsequently placed by the transport mechanism 15 under the control of the selectable mode control unit 32 in contact with the colorant meniscus of the colorant delivery chamber 18 within the printer front plate 40. The mixture of colorants contained in the colorant delivery chamber 18 is then drawn into the reflective receiver 19a by the capillary force of the paper fibers, or by the absorbing or mordanting force of the polymeric layer coated on the reflective receiver 19a. The receiver 19a is peeled away from the colorant delivery chamber 18 in the printer front plate immediately after the time required to reach the full density of the print. The receiver 19a cannot be left in contact with the front plate for too long a time or the density of the print will be higher than desired. One important advantage of the present invention is the reduction of the printing image defects that commonly occur when the cyan, magenta, and yellow colorants are printed in separate operations. Misregistration of the apparatus often leads to visible misregistration of the color planes being printed. In this invention, all the color planes are printed simultaneously, thus eliminating such misregistration.

Colorant from the black colorant reservoir 16 can be included in the colored in mixtures to improve the density of dark areas of the print, or can be used alone to print text, or line art, if such is included in the image being printed.

The construction of the printer 8 is such that a user can view the reverse side of the delivery chambers 18. The delivery chambers 18 are fabricated in a glass member so that they can be readily observed by a user. In this way, the printer also displays an image to be printed. This is disclosed in the above referenced U.S. patent application Ser. No. 08/882,620 filed Jun. 25, 1997. As shown, a receiver 19a is arranged to contact the chambers and to draw colorant from such chambers by capillary action.

The invention has been described in detail with particular reference to certain preferred embodiments thereof, but it will be understood that variations and modifications can be effected within the spirit and scope ol the invention. For example, scents can be directly premixed into colorants, such as ink, and for providing a common scent for each image printed on a receiver.

Parts List

S subject
1 camera
3 imaging lens
8 printer
11a reservoir
11b reservoir
11c reservoir
12 reservoir
13 reservoir 14 reservoir
15 transport mechanism
16 black colorant reservoir
17 microchannel capillaries
18 colorant delivery chambers
19 electrokinetic pumps
19a receiver
20 area image sensor
32 logic and control unit
32a central processing unit
32b execution memory
32c program memory
32d selectable mode control unit
34 electrical signal processor
35 temporary image memory
37 display driver
38 display device
40 printer front plate
42 multiple images

What is claimed is:

1. In an electronic camera responsive to a digital image stored in such camera and having a microfluidic printer for printing images onto a receiver to form continuous tone color pixels corresponding to the stored digital image, the improvement comprising:
   a) means for focusing an image of a subject at an image plane,
   b) area image sensor means disposed at the image plane for receiving the image subject and producing a digital image representing the subject,
   c) storage means coupled to the area image sensor for storing the digitized image of the subject;
   d) the microfluidic printer including a plurality of colorant reservoirs including reservoirs for containing cyan, magenta, and yellow colorants, respectively, and a plurality of colorant delivery chambers the microfluidic printer further, including,
      i) a plurality of colorant modifying fluid reservoirs containing colorant modifying fluids having different scents;
   e) selectable mode control means responsive to the digital image for causing colorants to be delivered from colorant reservoirs to selected colorant delivery chambers in the correct amount and for delivering particular ones of colorant modifying fluids from the plurality of colorant modifying fluid reservoirs to selected delivery chambers to provide a desired scent on a formed image, wherein the selectable mode control means automatically selects the colorant modifying fluid with the appropriate scent as a function of a predetermined condition, wherein the predetermined condition is a date or season of the year; and
   f) means for causing the transfer of the colorants with the selected colorant modifying fluid in the delivery chamber to the receiver to form a continuous tone color image having the desired scent.

2. The electronic camera of claim 1 further including another reservoir containing black colorant.

3. The electronic camera of claim 1 wherein the predetermined condition is a date or season of the year.

4. The electronic camera of claim 1 wherein the digital image is included in an image file which also includes the selection and amount of scent to be provided to an image and including means for decoding the selection of scent.

* * * * *